(12) United States Patent
Franco Romo et al.

(10) Patent No.: US 10,036,865 B2
(45) Date of Patent: Jul. 31, 2018

(54) PARKING DOOR ASSEMBLIES FOR USE WITH FIBER DISTRIBUTION HUBS AND METHODS OF INSTALLING PARKING DOOR ASSEMBLIES

(71) Applicant: CORNING RESEARCH & DEVELOPMENT CORPORATION, Hickory, NC (US)

(72) Inventors: Giovanna Monserrat Franco Romo, Reynosa (MX); William Julius McPhil Giraud, Azle, TX (US); Cynthia Cantu Martinez, Fort Worth, TX (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 15/702,133

(22) Filed: Sep. 12, 2017

(65) Prior Publication Data
US 2018/0081133 A1 Mar. 22, 2018

Related U.S. Application Data

(60) Provisional application No. 62/395,527, filed on Sep. 16, 2016.

(51) Int. Cl.
G02B 6/00 (2006.01)
G02B 6/36 (2006.01)
(Continued)

(52) U.S. Cl.
CPC ............ G02B 6/4452 (2013.01); E05D 3/02 (2013.01); G02B 6/3897 (2013.01); G02B 6/445 (2013.01); E05B 65/06 (2013.01); E05D 15/48 (2013.01)

(58) Field of Classification Search
CPC .... G02B 6/3897; G02B 6/445; G02B 6/4452; G02B 6/4453; E05B 365/06; E05D 3/02; E05D 15/48
(Continued)

(56) References Cited

U.S. PATENT DOCUMENTS 7,369,741 B2  5/2008 Reagan et al.
8,229,265 B2  7/2012 Solheid et al.
(Continued)

FOREIGN PATENT DOCUMENTS

CN      202486380 U     10/2012

OTHER PUBLICATIONS

International Search Repor and Written Opinion PCT/US2017/050369 dated Nov. 16, 2017.

Primary Examiner — Jerry Rahll
Assistant Examiner — Michael Mooney

(57) ABSTRACT

A fiber distribution hub includes an exterior cabinet housing, a cabinet door, a distribution panel, and a parking door assembly. The distribution panel located in a cable holding volume defined by the exterior cabinet housing includes a fiber distribution field formed of connector adapters that provide a connection between feeder cables and distribution cables. The distribution panel includes a pivot axis opposite a swinging side, where the swinging side moves about the pivot axis between a partially accessible configuration and a fully accessible configuration. The parking door assembly moveably connects to the swinging side of the distribution panel. The parking door assembly includes a parking door including a connector holder retaining structure configured to retain a plurality of fiber optic connectors and a hinge structure that connects the parking door to the swinging side of the distribution panel.

20 Claims, 12 Drawing Sheets

(51) Int. Cl.
- *G02B 6/44* (2006.01)
- *G02B 6/38* (2006.01)
- *E05D 3/02* (2006.01)
- E05D 15/48 (2006.01)
- E05B 65/06 (2006.01)

(58) Field of Classification Search
USPC .......................................... 385/53, 134–139
See application file for complete search history.

(56) References Cited

U.S. PATENT DOCUMENTS

| | | |
|---|---|---|
| 8,238,709 B2 | 8/2012 | Solheid et al. |
| 2006/0008231 A1 | 1/2006 | Reagan et al. |
| 2009/0263096 A1 | 10/2009 | Solheld et al. |
| 2010/0046905 A1* | 2/2010 | Gniadek .............. G02B 6/4453 385/135 |

\* cited by examiner

PARKING DOOR ASSEMBLIES FOR USE WITH FIBER DISTRIBUTION HUBS AND METHODS OF INSTALLING PARKING DOOR ASSEMBLIES

PRIORITY APPLICATION

This application claims the benefit of priority of U.S. Provisional Application Ser. No. 62/395,527, filed on Sep. 16, 2016, the content of which is relied upon and incorporated herein by reference in its entirety.

TECHNICAL FIELD

The present specification generally relates to parking door assemblies for use with fiber distribution hubs and methods of installing parking door assemblies to fiber distribution hubs.

BACKGROUND

Fiber distribution hubs (FDHs) are commonly used at local convergence points or network access points to optically connect optical fiber cables in order for optical signals to be routed as desired. Some fiber distribution hubs include connectorized (either in the field or in the factory) optical fiber cables that may be selectively optically connected to one another, such as with an adapter. Such connections, as in a distribution field or the like, may be provided to enable a service provider to selectively connect or disconnect particular subscribers who request service or cancel service, respectively.

As a telecommunications enclosure may include dozens or hundreds of loose, unconnected optical fiber connectors that are reserved for future connections to provide subscribers service, fiber distribution hubs may include fiber routing guides and/or connector holders to organize the loose, unconnected optical fiber connectors and cables. This organization of the connectors and/or cables is important as it can (i) enable a technician to quickly and easily find the particular connector/cable desired to be connected, (ii) enable the connectors to be safely stored to minimize the likelihood of damage to the connector cable, and/or (iii) allow the connectors and cables to be stored in such a way that they do not interfere with other service work the technician may need to do within the enclosure.

Some fiber distribution hubs include optical fiber cables that are grouped together with tie-wraps or the like, which may not provide adequate protection to the connectors. Further fiber distribution hubs can include connector holders that gang a group of connectors together but that are free to dangle with the cables looped around routing guides, which may not allow a technician to quickly and conveniently find the particular connector and/or connectors needed at the time.

Therefore, a need exists for a parking door assembly for fiber distribution hubs that includes a connector parking area at an interior surface of the parking door assembly such that connectors can be conveniently removed as desired and requiring less volume within the interior cavity of the fiber distribution hubs.

SUMMARY

According to the subject matter of the present disclosure, a fiber distribution hub includes an exterior cabinet housing, a cabinet door, a distribution panel, and a parking door assembly. The exterior cabinet housing includes a front with an access opening and defining a cable holding volume therein. The cabinet door moveably connects to the exterior cabinet housing. The cabinet door includes an open configuration allowing access to the cable holding volume through the access opening and a closed configuration that inhibits access to the cable holding volume through the access opening. The distribution panel located in the cable holding volume includes a fiber distribution field formed of connector adapters that provide a connection between feeder cables and distribution cables. The distribution panel includes a pivot axis opposite a swinging side, where the swinging side moves about the pivot axis between a partially accessible configuration and a fully accessible configuration. The parking door assembly moveably connects to the swinging side of the distribution panel. The parking door assembly includes a parking door including a connector holder retaining structure configured to retain a plurality of fiber optic connectors and a hinge structure that connects the parking door to the swinging side of the distribution panel.

In accordance with another embodiment of the present disclosure, a method of assembling a parking door assembly to a fiber distribution hub thereby increasing a parking capacity of the fiber distribution hub includes obtaining the parking door assembly. The parking door assembly includes a parking door having a connector holder retaining structure configured to retain a plurality of fiber optic connectors, a hinge structure that connects to a pivot side of the parking door opposite a swinging side of the parking door, and a door mounting bracket that connects to the hinge structure. The method further includes connecting the parking door assembly including the parking door, the hinge structure and the door mounting bracket to a swinging side of the distribution panel opposite a pivot axis of a distribution panel of the fiber distribution hub. The distribution panel includes a fiber distribution field formed of connector adapters that provide a connection between feeder cables and distribution cables. The distribution panel is capable of moving between a partially accessible configuration and a fully accessible configuration. The parking door is capable of moving between a partially accessible configuration and a fully accessible configuration.

Additional features and advantages of the claimed subject matter will be set forth in the detailed description which follows, and in part, will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Embodiments described herein generally relate to parking door assemblies for fiber distribution hubs and methods of installing parking door assemblies to fiber distribution hubs. In some embodiments, for example, the parking door assemblies may be provided as a kit that can be used to connect the parking door assemblies to fiber distribution panels of the fiber distribution hubs. The parking door assemblies include a connector parking door that includes a connector parking field that can be used to park multiple optical fiber connectors and/or groups of optical fiber connectors to protect and organize the optical fiber connectors. The connector parking field can also reduce clutter within the fiber distribution hubs due to loose optical fiber connectors and associated optical fiber cables located within the fiber distribution hubs.

Figure 1:
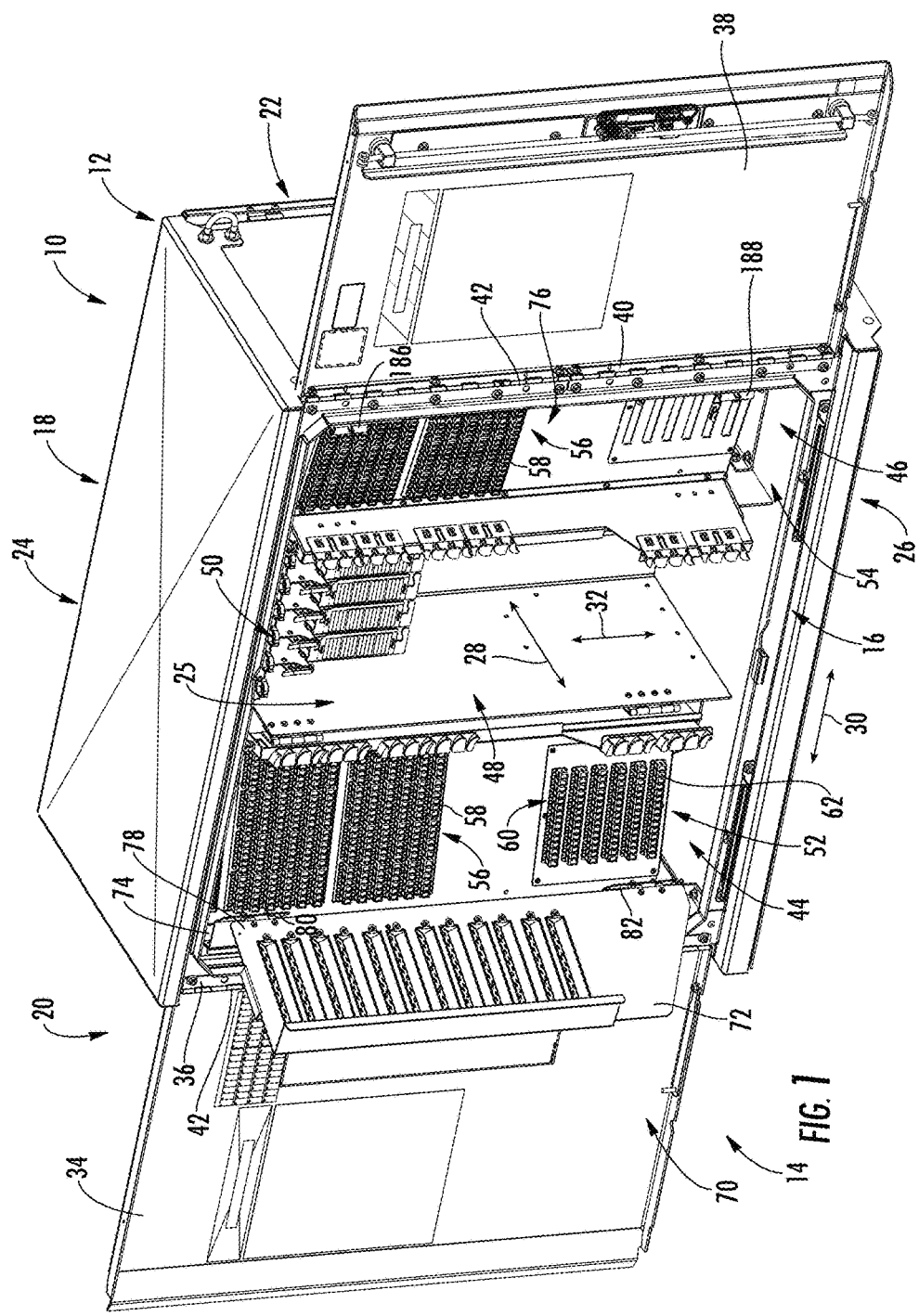
FIG. 1 is a perspective view of a fiber distribution hub including a parking door assembly, according to one or more embodiments shown and described herein.

Referring to FIG. 1, a fiber distribution hub 10 includes a cabinet housing 12 having a front 14 with an access opening 16, a rear 18, sides 20 and 22, top 24 and bottom 26 with the access opening 16 extending between the sides 20, 22, top 24 and bottom 26 and the cabinet housing 12 defining a cable holding volume 25 located therein. As defined herein, a longitudinal direction 28 of the fiber distribution hub 10 extends generally perpendicularly through the front 14 and the rear 18 and generally parallel to the sides 20 and 22 of the cabinet housing 12. A lateral direction 30 of the fiber distribution hub 10 extends generally perpendicular to the longitudinal direction 28 between the sides 20 and 22. A vertical direction 32 of the fiber distribution hub 10 extends generally perpendicularly to the longitudinal direction 28 and the lateral direction 30 and through the top 24 and bottom 26.

A first cabinet door 34 is hingedly connected along a front edge 36 of the side 20 of the cabinet housing 12 and a second cabinet door 38 is hingedly connected along a front edge 40 of the side 22 of the cabinet housing 12. The first and second cabinet doors 34 and 38 are connected to the front edges 36 and 40 of sides 20 and 22, respectively, by hinges 42 such that the first and second cabinet doors 34 and 38 swing toward and away from one another between closed and open configurations. In the open configuration, as illustrated by FIG. 1, the first and second cabinet doors 34 and 38 allow access to the cable holding volume 25 of the cabinet housing 12. In the closed configuration, the first and second cabinet doors 34 and 38 swing toward each other to inhibit access to the cable holding volume 25.

The cabinet housing 12 may be divided into sections with an inner section being a splitter module section 48 and outer sections being distribution panel sections 44 and 46. One or more splitter modules 50 may be connected to the fiber distribution hub 10 in the splitter module section 48. The splitter modules 50 may each have a plurality of connectorized pigtails or optical fiber cables 53 (FIG. 7), such as 16 or 32 outputs per splitter module 50. The optical fiber connectors 55 (FIG. 7) may include a ferrule, connector body and boot; however, further embodiments may have additional and/or alternative components. The distribution panel sections 44 and 46 may each have a respective distribution panel 52 and 54 that provides a termination location between feeder cables, such as the optical fiber cables and distribution cables that can be routed to subscriber locations. The distribution panels 52, 54 include a fiber distribution field 56 that is formed of arrays of individual connector adapters 58 that can connect the optical fiber connectors 55 to the distribution cable connectors, thereby providing communication therebetween. When an optical fiber cable is not in use, the distribution panels 52, 54 may include a connector parking field 60. The connector parking field 60 may be formed of individual arrays of connector holding retainer structures 62 that have an opening that is sized and shaped to receive the optical fiber connectors 55. In some embodiments, the connector parking field 60 may include hanging structures, for example, for hanging optical fiber connector holders that can hold a number of the optical fiber connectors together.

Figure 2:
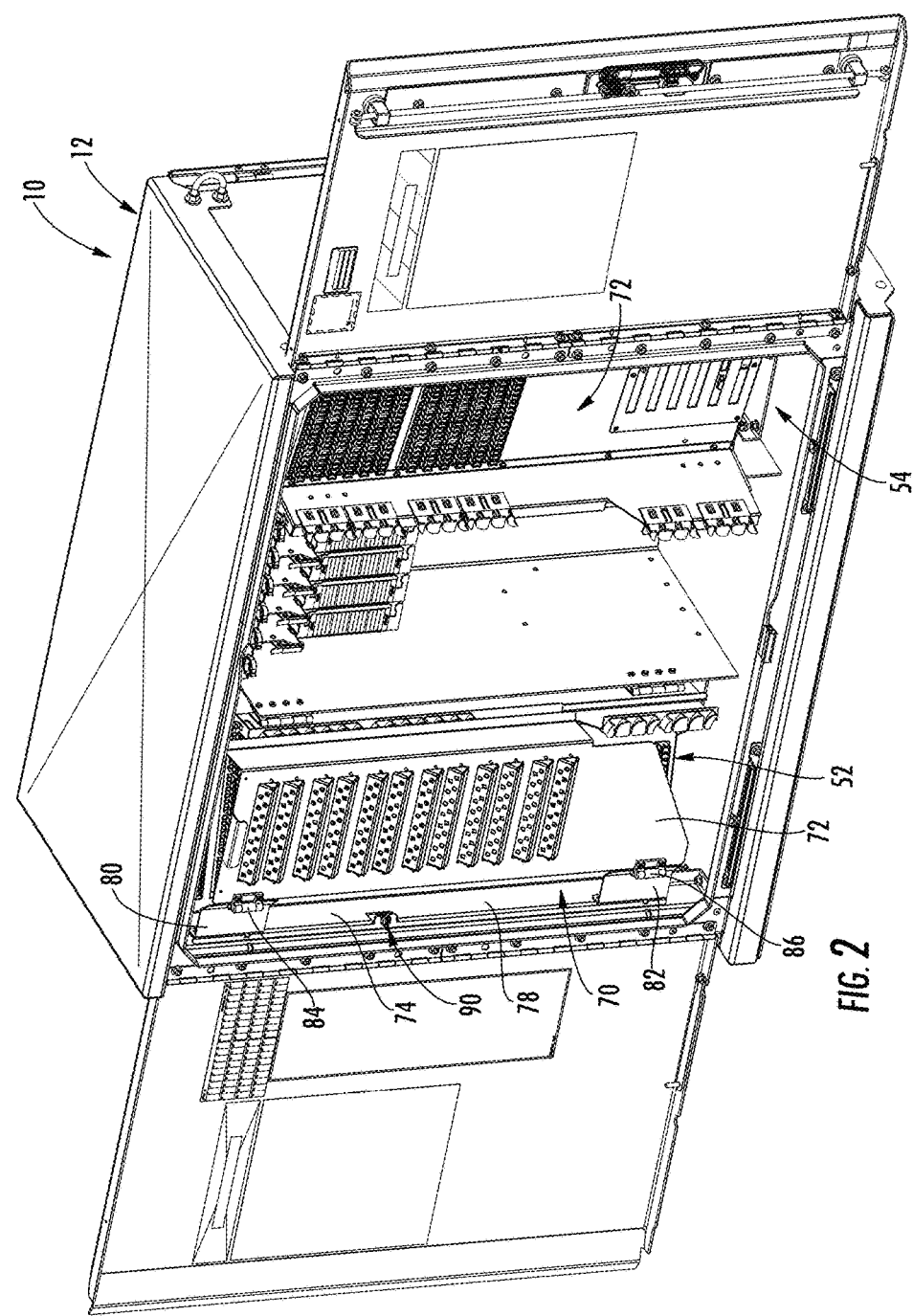
FIG. 2 is another perspective view of the fiber distribution hub of FIG. 1.

Referring to FIGS. 1 and 2, the fiber distribution hub 10 further includes a parking door assembly 70. The parking door assembly 70 includes a parking door 72 that is hingedly connected to a non-pivoting, i.e., swinging side 74 of the distribution panel 52. As used herein, "non-pivoting side" and "swinging side" may be used interchangeably to refer to the side of the distribution panel 52 that is furthest from the axis of rotation of the distribution panel 52, which will be described in greater detail below. While only one parking door assembly 70 is illustrated connected to distribution panel 52, another parking door assembly may also be hingedly connected to the non-pivoting side 76 of the distribution panel 54. This parking door assembly may have the same or similar features as the parking door assembly 70.

The parking door 72 may include a pivoting side 78 that is connected to the non-pivoting side 74 of the distribution panel 52 by door mounting brackets 80 and 82. Referring particularly to FIG. 2, the door mounting brackets 80 and 82 may be fixedly mounted to the non-pivoting side 76 of the distribution panel 54 by any suitable fashion such as fasteners, adhesive, welding, etc. Hinge structures 84 and 86 may be used to connect the parking door 72 to the door mounting brackets 80 and 82. In some embodiments, the hinge structures 84 and 86 may be friction hinges that can hold their position through a full range of motion. In some embodiments, the friction hinges may be adjustable to adjust the amount of operating effort to move the parking door 72 between open (FIG. 1) and closed (FIG. 2) configurations.

Figure 3:
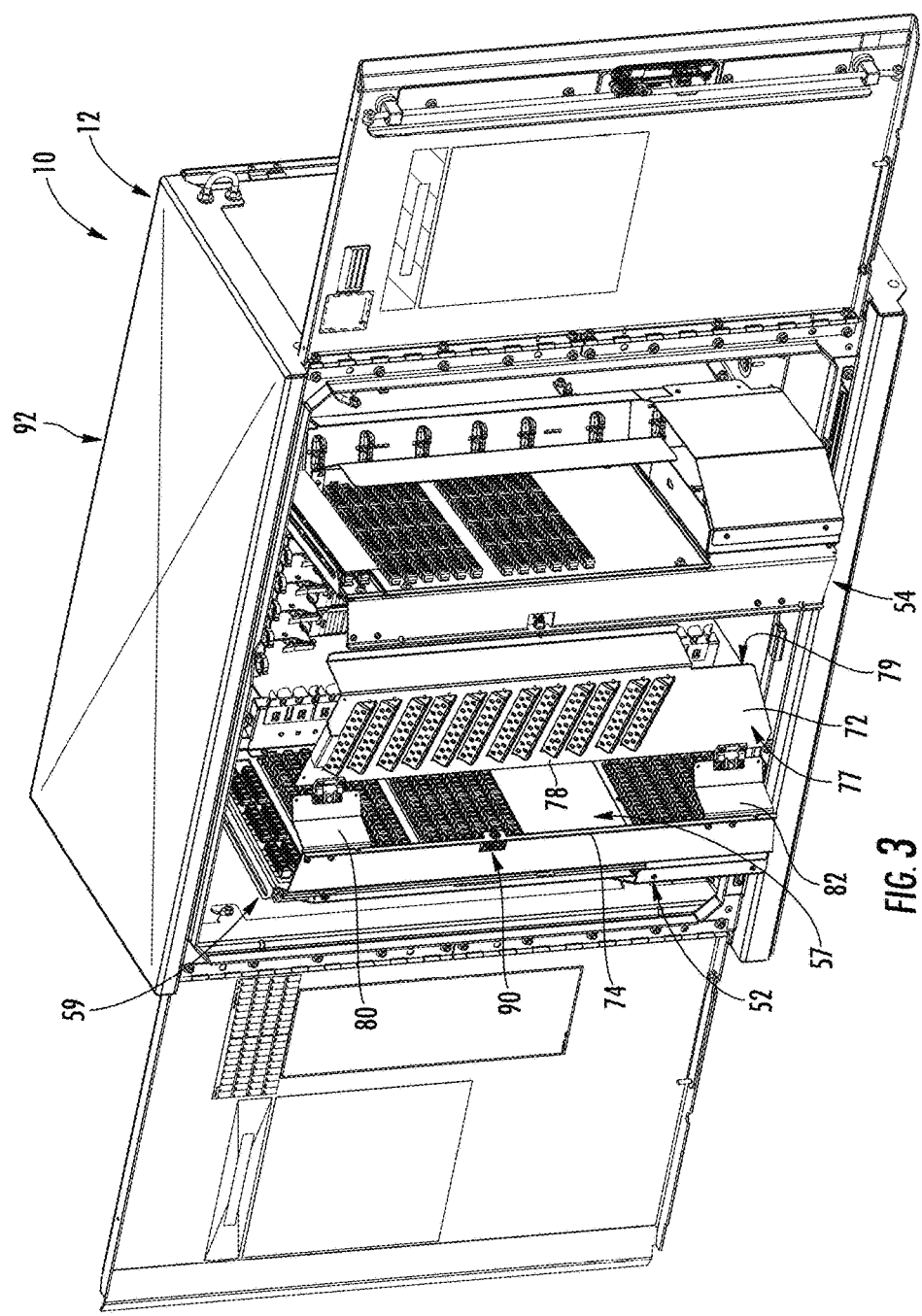
FIG. 3 is another perspective view of the fiber distribution hub of FIG. 1.

As can be best seen by FIG. 2 and also FIG. 3, the door mounting brackets 80 and 82 have a size and shape that spaces the pivoting side 78 of the parking door 72 away from the non-pivoting side 74 of the distribution panel 52. Such a bracket arrangement can provide a space between the non-pivoting side 74 of the distribution panel 52 and the pivoting side 78 of the parking door 72. A lock structure 90 may be provided at the non-pivoting side 74 of the distribution panel 52. The space between the non-pivoting side 74 of the distribution panel 52 and the pivoting side 78 of the parking door 72 can allow for accessing the lock structure 90 with the parking door 72 in the open configuration (as shown in FIG. 1) and the closed configuration (as shown in FIG. 2), which can allow for pivoting of the distribution panel 52. The lock structure 90 can also inhibit pivoting of the distribution panel 52, for example, from the rear 18 of the cabinet housing 12. The lock structure 90 may lock the distribution panel in the partially accessible configuration where the lock structure 90 is accessible through a space between the pivoting side 78 of the parking door 72 and the non-pivoting side 74 of the distribution panel 52.

FIG. 3 illustrates the distribution panel 52 in a swung out, longitudinally-oriented configuration or fully accessible configuration as opposed to swung in, laterally-oriented configuration or partially accessible configuration (FIGS. 1 and 2). As used herein, the distribution panel is in a "partially accessible configuration" when at least the front 57 of the distribution panel 52 is accessible, absent the parking door 72. As used herein, the distribution panel is in a "fully accessible configuration" when both the front 57 and back 59 of the distribution panel 52 are accessible, absent the parking door 72. The longitudinally-oriented configuration or fully accessible configuration allows for accessing a subscriber side 92, e.g., back 59 of the distribution panel 52, for example, for adding or removing subscriber cables, as needed, or other areas of the fiber distribution hub. As can be seen by FIG. 3, the door mounting brackets 80 and 82 space the pivot axis 323 (FIG. 10) of the parking door 72 both laterally and longitudinally from the non-pivoting side 74 of the distribution panel 52.

Figure 4:
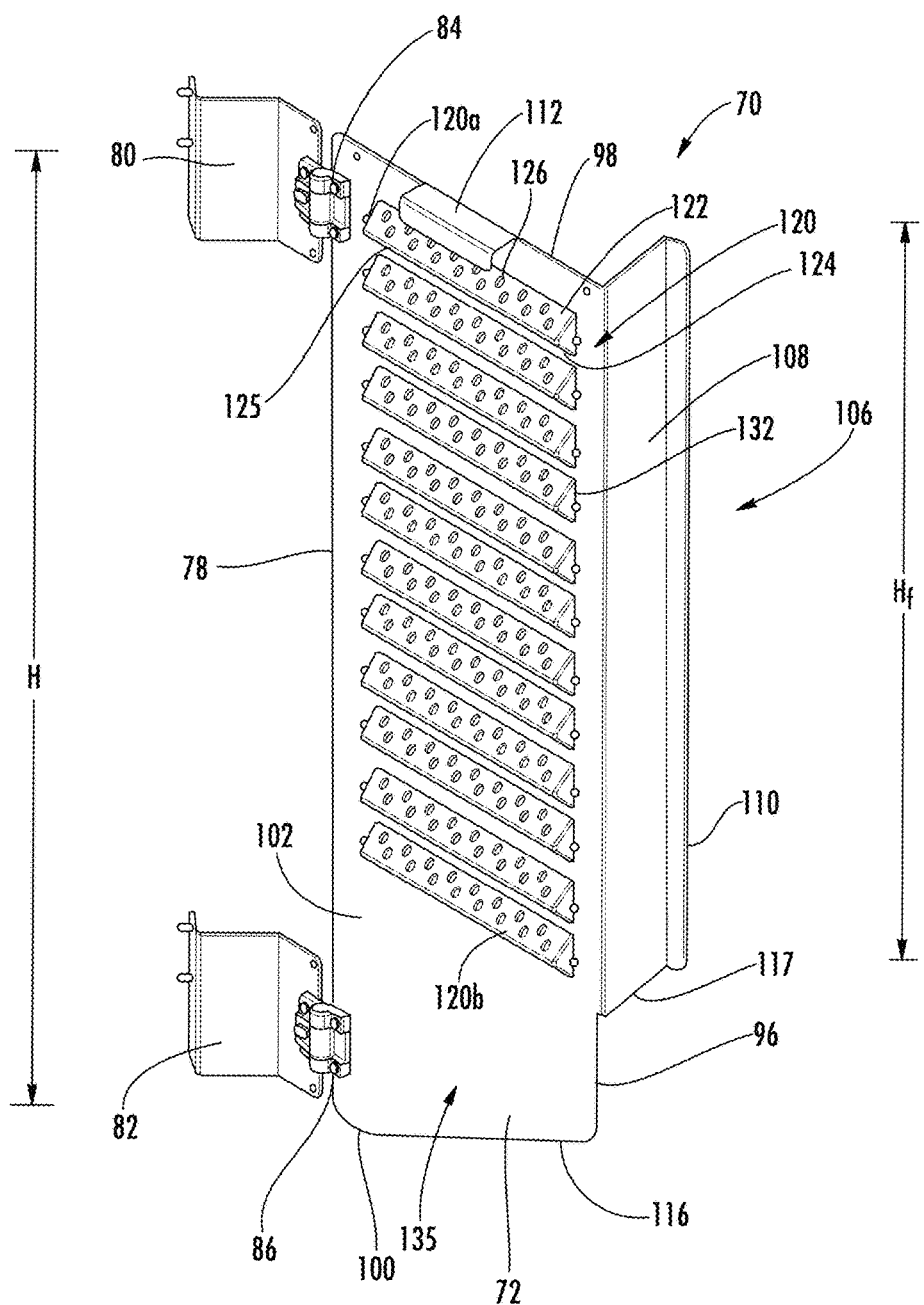
FIG. 4 is a perspective view of the parking door assembly of the fiber distribution hub of FIG. 1, according to one or more embodiments shown and described herein.

Referring now to FIG. 4, the parking door assembly 70 is illustrated in isolation, which can also represent components of a door assembly kit. The parking door assembly 70 includes the parking door 72, the door mounting brackets 80 and 82 and the hinge structures 84 and 86 that pivotally connect the parking door 72 to the door mounting brackets 80 and 82. The parking door 72 includes the pivoting side 78, a swinging side 96, a top 98 and a bottom 100. The parking door 72 is a generally planar structure that includes a door body 102 that is generally planar. A stop flange structure 106 extends vertically along a height $H_f$ of the parking door 72. As can be seen, the height $H_f$ is less than a maximum height H of the parking door 72, which is located at the pivoting side 78.

The stop flange structure 106 has a longitudinally extending portion 108 (with the parking door 72 in the closed configuration) extending away from the door body 102 and a laterally extending portion 110 (with the parking door 72 in the closed configuration) that extends away from the longitudinally extending portion 108. The stop flange structure 106 can provide a stop that inhibits over rotation of the parking door 72 into the closed configuration (FIG. 2), which can reduce connector-to-connector contact and bending of the optical fibers sandwiched between the parking door 72 and the distribution panel 52. A handle structure 112 is provided at the top 98 of the parking door 72, which can allow grasping and facilitate opening of the parking door 72.

As discussed above, the stop flange structure 106 extends only partially over the height H of parking door 72. The swinging side 96 extends vertically beyond the stop flange structure 106 to a tapered portion 116 that tapers downwardly to the bottom 100. In some embodiments, a bottom edge 117 of the stop flange structure 106 may also be tapered vertically upward. Such a tapered arrangement of the door body 102 can provide space that can accommodate the optical fiber cable of the splitter modules with the parking door 72 in the closed configuration (FIG. 2).

Figure 7:
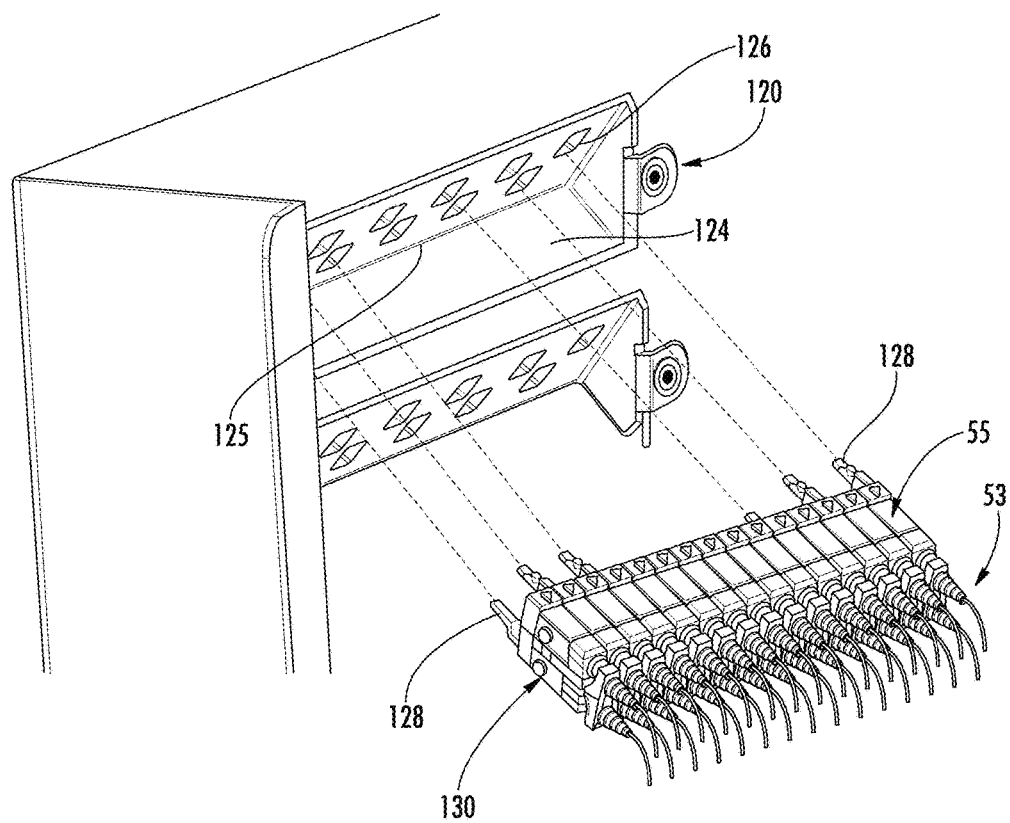
FIG. 7 illustrates a method for parking multiple optical fiber connectors of optical fiber cables using a parking door assembly, according to one or more embodiment shown and described herein.

The parking door 72 includes a plurality of connector holder retaining structures 120 that extend widthwise along the door body 102 and are aligned vertically along the height H of the parking door 72. The connector holder retaining structures 120 may be formed as a V-shaped panel structure having an upper panel 122 and a lower panel 124 that meet at an apex 125 forming the V-shape. The upper panel 122 has a plurality of openings 126 that are arranged to receive holder retainers 128 (FIG. 7) of an optical fiber connector holder 130 (FIG. 7). The connector holder retaining structures 120 may be formed separately from the door body 102 and then connected thereto within slots 132 formed through the door body 102. The connector holder retaining structures 120 may be connected to the door body 102 using any suitable method, such as fasteners, adhesives, welding etc.

As can be seen, the plurality of connector holder retaining structures 120 extend only partially along the height H of the parking door 72 and, as a group, are generally located nearer the top 98 than the bottom 100 of the parking door 72. In particular, an uppermost connector holder retaining structure 120a is nearer the top 98 and a bottommost connector holder retaining structure 120b is further from the bottom 100 of the parking door 72, leaving a space 135 between the bottommost connector holder retaining structure 120b and the bottom 100. In other words, the first vertical distance between an uppermost connector holder retaining structure 120a and a top 98 of the parking door 72 is less than a vertical distance between the bottommost connector holder retaining structure 120b and the bottom 100 of the parking door 72. Such an arrangement can provide increased space from the optical fiber connectors and the bottom area of the fiber distribution hub 10, which can allow room for the optical fiber cables that are stored at the bottom (26, FIG. 1) of the fiber distribution hub (10, FIG. 1) due to their length.

Figure 5:
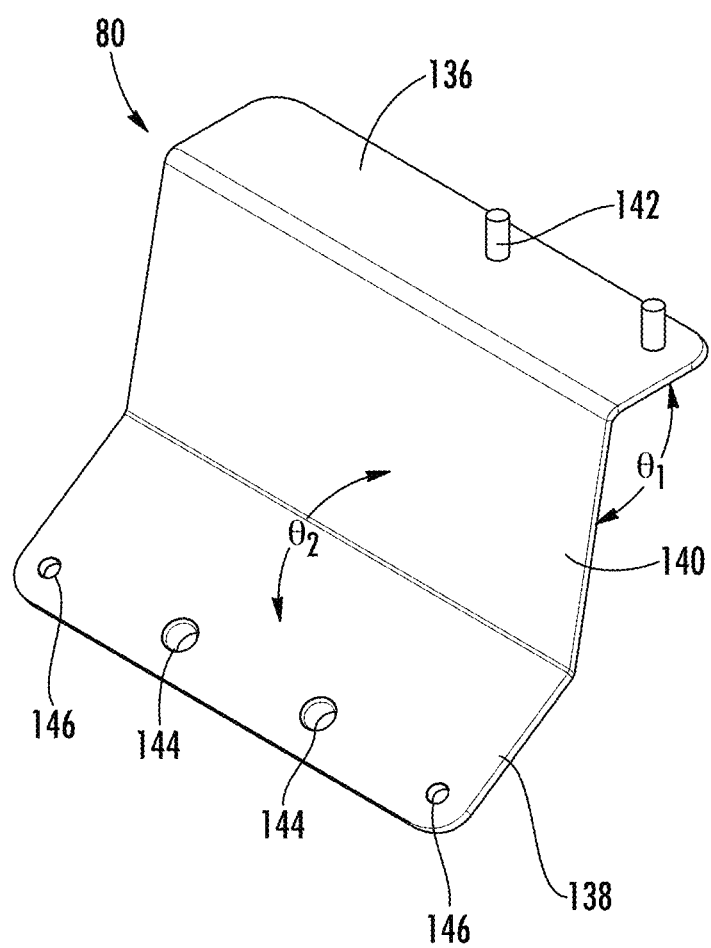
FIG. 5 is a perspective view of a door mounting bracket for use with the parking door assembly of FIG. 4, according to one or more embodiment shown and described herein.

Referring to FIG. 5, the door mounting bracket 80 is illustrated in isolation. The door mounting bracket 80 includes a panel mounting portion 136 and a door mounting portion 138. A spacer portion 140 spaced the door mounting portion 138 from the panel mounting portion 136 in both the longitudinal and lateral directions. In particular, an angle $\theta_1$ between the panel mounting portion 136 and the spacer portion 140 is greater than 90 degrees. Another angle $\theta_2$ between the door mounting portion 138 and the spacer portion 140 is also greater than 90 degrees. Retaining pegs 142 may be provided that can be received within preformed holes of the distribution panel 52 (FIG. 3). Fasteners may be used to secure the retaining pegs 142 to the distribution panel 52. The door mounting portion 138 may include a first set of openings 144 for connecting to the hinge structure 84 and a second set of openings 146 for connecting to the door body 102 (FIG. 1).

In the example shown by FIG. 4, the parking door assembly 70 may include twelve connector holder retaining structures 120, each sized and configured to retain 32 optical fiber connectors for a total of 408 optical fibers and associated optical fiber connectors. In the embodiment of FIGS. 1-3, an additional parking door assembly may be provided for the distribution panel 54, increasing the number of connector holder retaining structures 120 provided by the parking door assemblies to 24. The parking capacity of the parking door assemblies is in addition to the connector parking fields 60 provided on the distribution panels 52 and 54, which increase the total parking capacity of the fiber distribution hub to 1152 total optical fibers and associated optical fiber connectors. Such a parking arrangement can provide 100 percent parking capacity for the optical fiber connectors for a particular fiber distribution hub embodiment, which corresponds to one optical fiber connector for each of the individual connector adapters 58 of the fiber distribution fields 56 of both distribution panels 52 and 54. That is, all optical fiber connectors at maximum splitter module capacity have a place to park within the fiber distribution hub 10 if none of the feeder optical fibers are in use.

Figure 6:
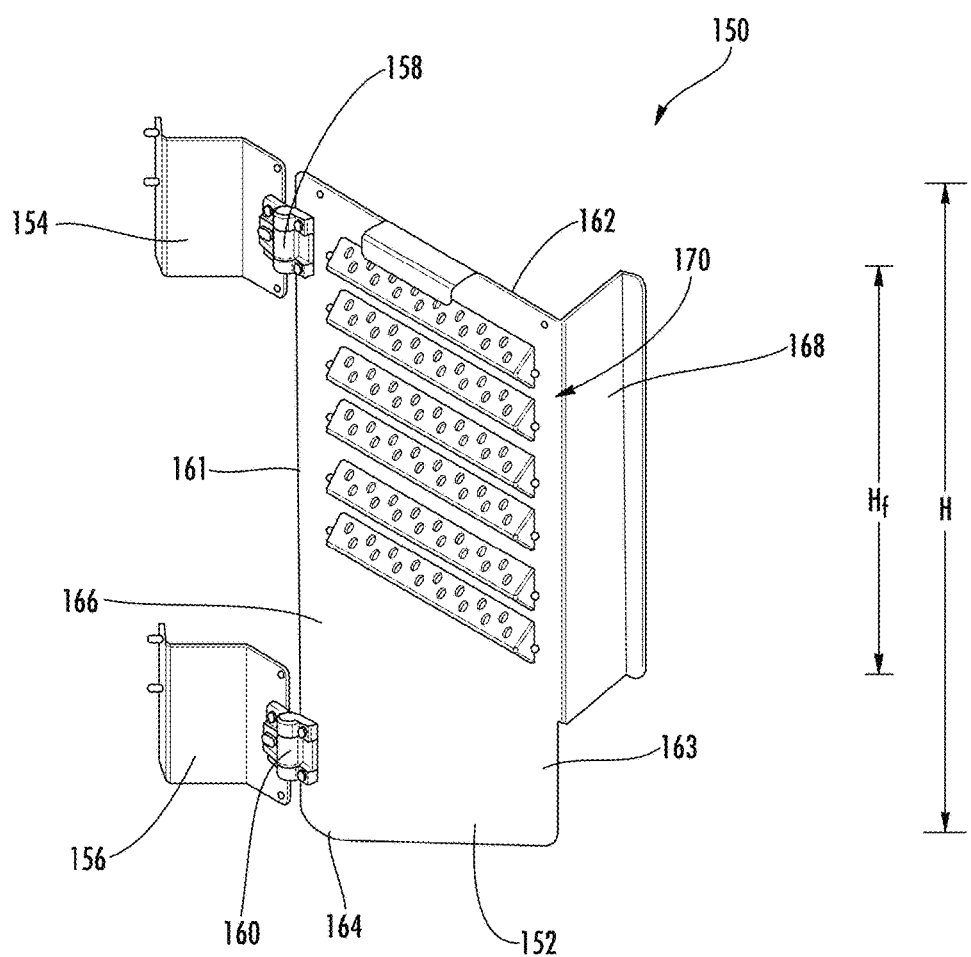
FIG. 6 is a perspective view of another embodiment of a parking door assembly, according to one or more embodiment shown and described herein.

While the fiber distribution hub 10 of FIG. 1 and associated parking door assembly 70 illustrate a relatively large capacity, lower capacity fiber distribution hubs with lower capacity parking door assemblies may be provided. Referring to FIG. 6, as another example, a parking door assembly 150 includes many of the features described above with regard to parking door assembly 70 including a parking door 152, door mounting brackets 154 and 156 and hinge structures 158 and 160 that pivotally connect the parking door 152 to the door mounting brackets 154 and 156. The parking door 152 includes a pivoting side 161, a swinging side 163, a top 162 and a bottom 164. The parking door 152 is a generally planar structure that includes a door body 166 that is generally planar. A stop flange structure 168 extends vertically along a height $H_f$ of the parking door 152. As can be seen, the height $H_f$ is less than a maximum height H of the parking door 152, which is located at the pivoting side 161.

As above, the parking door 152 includes a plurality of connector holder retaining structures 170 that extend widthwise along the door body 166 and are aligned vertically along the height H of the parking door 152. In this embodiment, there are less connector holder retaining structures 170 than included with the parking door 72. In particular, the parking door includes six connector holder retaining structures 170 arranged along the height H of the parking door 152, where each of the connector holder retaining structures 170 can accommodate 32 optical fiber connectors for a total of 192 optical fiber connectors.

Referring to FIG. 7, a method for parking multiple optical fiber connectors 55 of optical fiber cables 53 is illustrated. The optical fiber connectors 55 may be bundled together using the optical fiber connector holder 130 that includes holder retainers 128 that may be inserted into the openings 126 of the connector holder retaining structures 120 in a friction fit fashion. The lower panel 124 may provide a support surface against which the optical fiber connectors 55 with the optical fiber connector holder 130 can rest and be supported in a downward angled fashion relative to horizontal extending away from apex 125. In other embodiments, the lower panel 124 of the connector holder retaining structures 120 may have the openings for receiving the holder retainers, which can provide the optical fiber connectors 55 with an upward angled orientation relative to horizontal.

Figure 8:
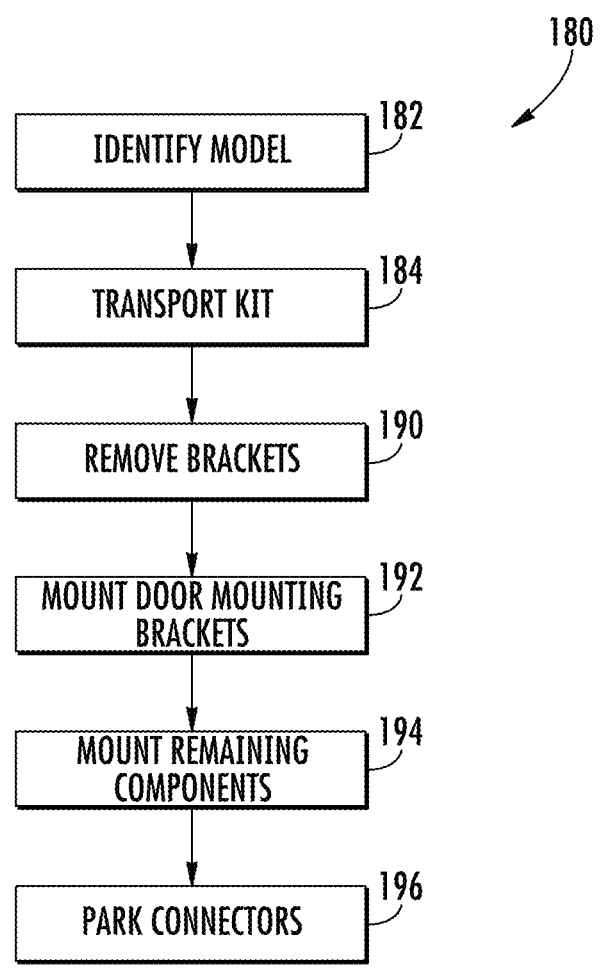
FIG. 8 illustrates a method of assembling a parking door assembly kit that includes the components of a parking door assembly, according to one or more embodiments shown and described herein.

Referring to FIG. 8, a method 180 of assembling a parking door assembly kit that includes the components of the parking door assembly, such as parking door assembly 70 is illustrated. The method 180 includes identifying the model of the fiber distribution hub and selecting a corresponding parking door assembly kit suitable of that fiber distribution hub and its optical fiber capacity at step 182. At step 184, the user transports the parking door assembly kit for installation at a fiber distribution hub, such as the fiber distribution hub 10 of FIG. 1. The parking door assembly kit may include a parking door having a connector holder retaining structure configured to retain a plurality of fiber optic connectors, a hinge structure that connects to a pivot side of the parking door opposite a swinging side of the parking door, and a door mounting bracket that connect to the hinge structure.

The parking door assembly may arrive assembled, disassembled or partially assembled with the door mounting brackets 80 and 82 (FIG. 2), parking door 72 and hinge structures 84 and 86 (FIG. 2). The distribution panel (see distribution panel 54 of FIG. 1) may include swing brackets 186 and 188 (FIG. 1) that are already assembled to the distribution panel 54. The swing brackets 186 and 188 (FIG. 1) may be provided to provide stops during movement of the distribution panel between swung out and swung in configurations. The hinge structures 84 and 86 and the door mounting brackets 80 and 82 may be connected to the non-pivoting side 74 of the distribution panel 52 opposite the pivot axis 323 (FIG. 10) of the distribution panel 54 of the fiber distribution hub 10. In order to mount the door mounting brackets, the swing brackets 186 and 188 (FIG. 1) may be removed at step 190. The door mounting brackets may then be mounted to the existing openings used by the swing brackets 186 and 188 (FIG. 1) using fasteners at step 192. At step 194, the remaining components of the door assembly may be mounted together, if needed thereby providing the additional parking capacity of the parking door assembly. At step 196, the optical fiber connectors may be parked within the connector holder retaining structures, as described above. In some embodiments, the hinge structure may be a friction hinge whose resistance to movement can be adjusted.

Figure 9:
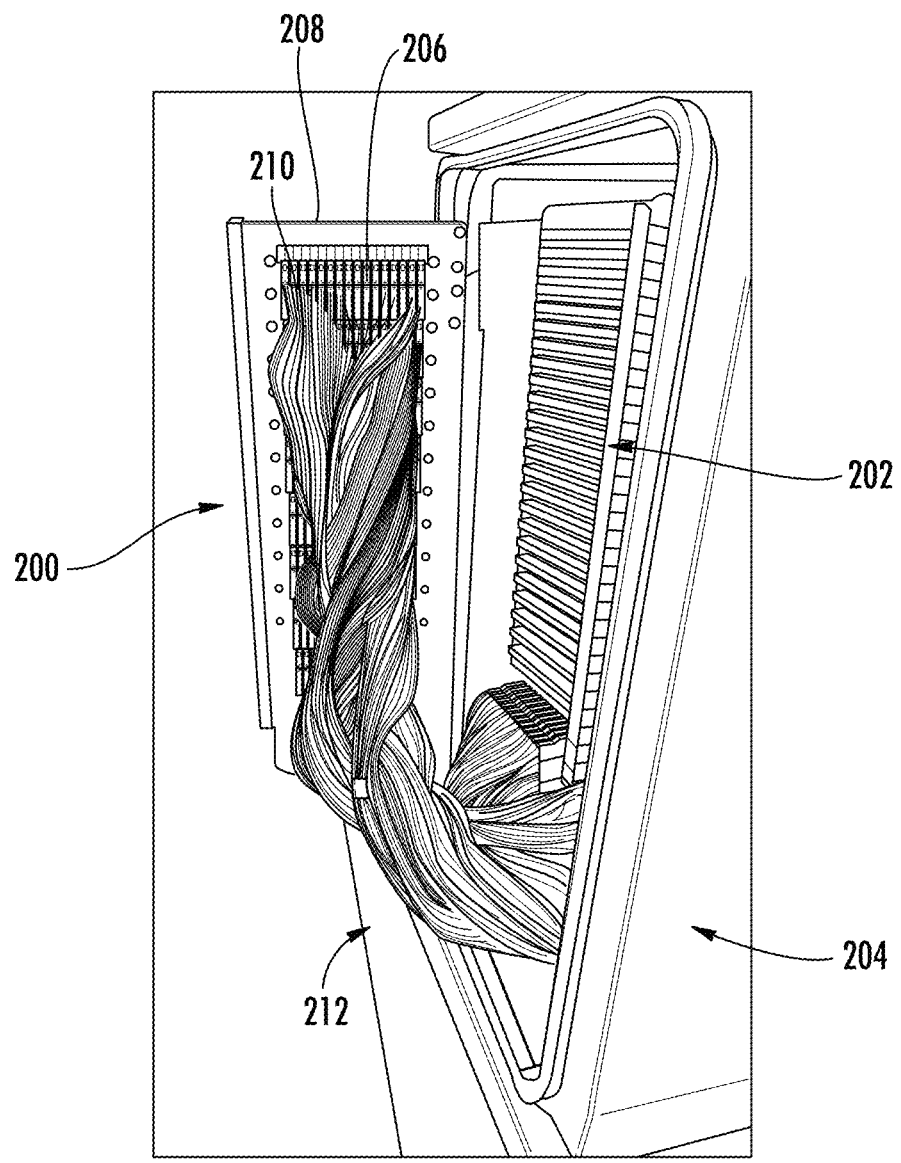
FIG. 9 illustrates another example of a parking door assembly including optical fiber cable with optical fiber connectors parked on a parking door of the parking door assembly, according to one or more embodiments shown and described herein.

Referring to FIG. 9, another embodiment of a parking door assembly 200 is illustrated mounted to a distribution panel 202 of a fiber distribution hub 204 in a fashion similar to that described above. As can be seen, the optical fiber connectors 206 are oriented downwardly extending away from a parking door 208 with the fiber optic cables 210 tending to accumulate in a floor or bottom 212 of the fiber distribution hub 204. The above-described parking door assemblies can provide a 100 percent capacity to park the optical fiber connectors while accommodating the lengths of the fiber optic cables being stored at the bottom of the fiber distribution hubs.

Figure 10:
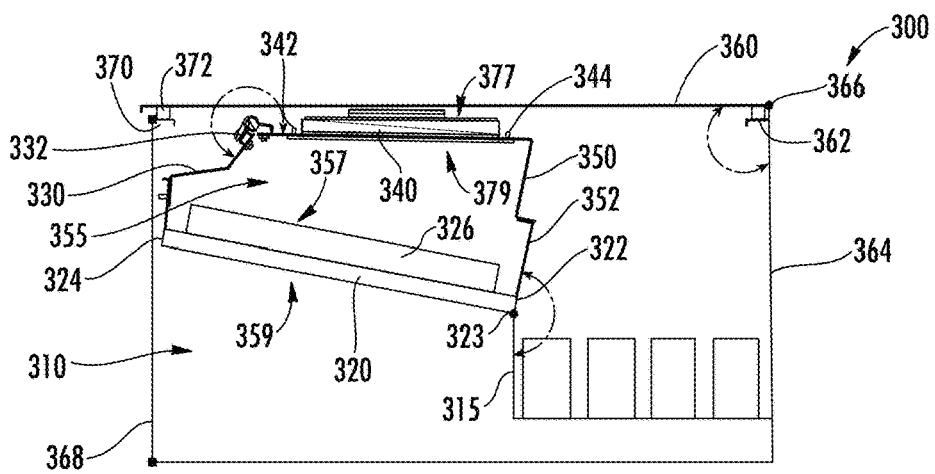
FIG. 10 is a top view of a fiber distribution hub where the cabinet door and parking door are closed, according to one or more embodiments shown and described herein.
Figure 11:
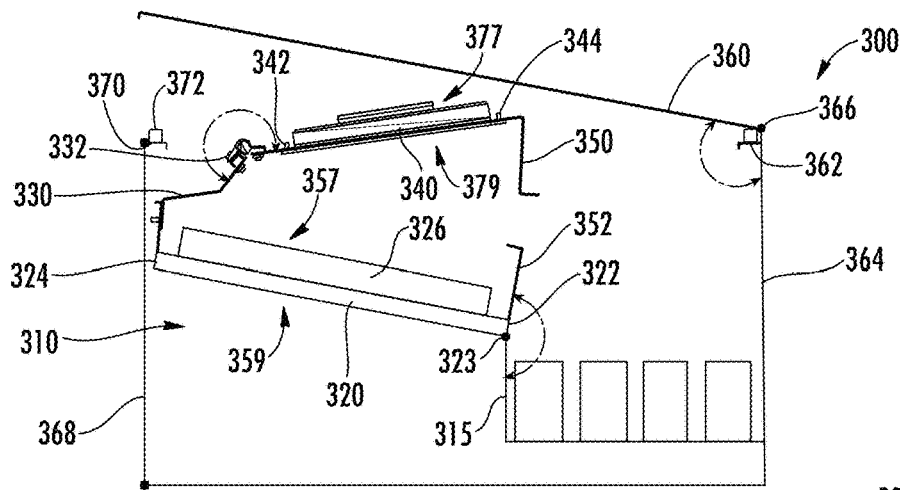
FIG. 11 is a top view of a fiber distribution hub where the cabinet door and parking door are ajar, according to one or more embodiments shown and described herein.
Figure 12:
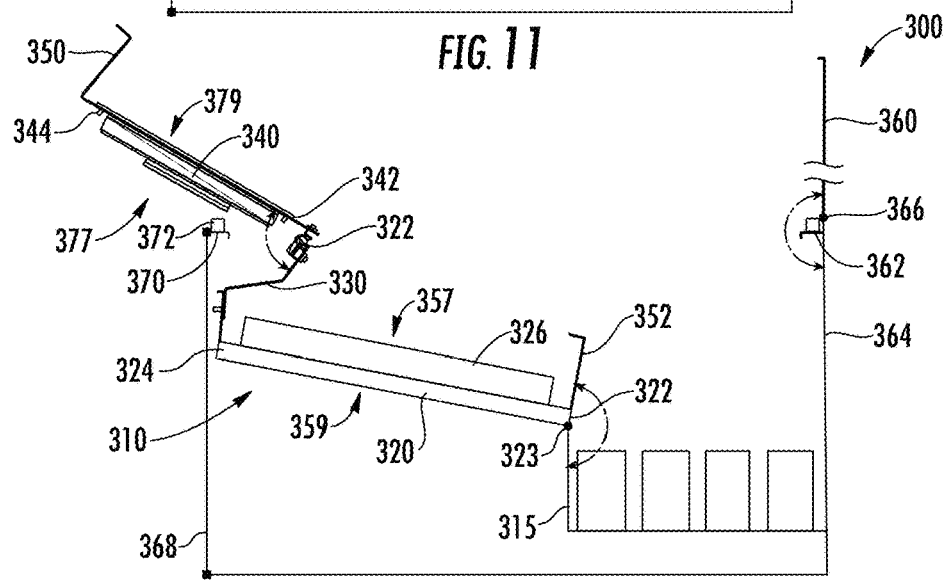
FIG. 12 is a top view of a fiber distribution hub where the cabinet door and parking door are open, according to one or more embodiments shown and described herein.
Figure 13:
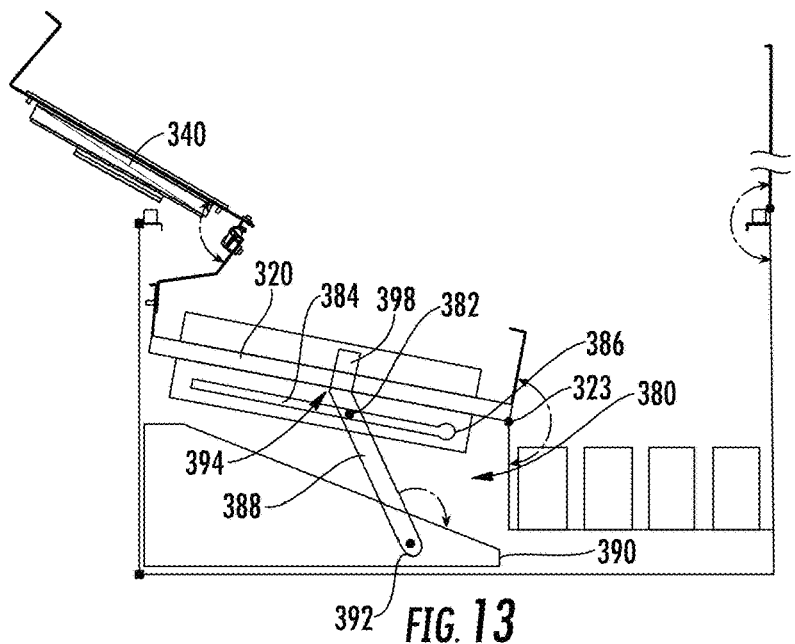
FIG. 13 is a top view of a fiber distribution hub having a distribution panel with a stay assembly in a partially accessible configuration, according to one or more embodiments shown and described herein.
Figure 14:
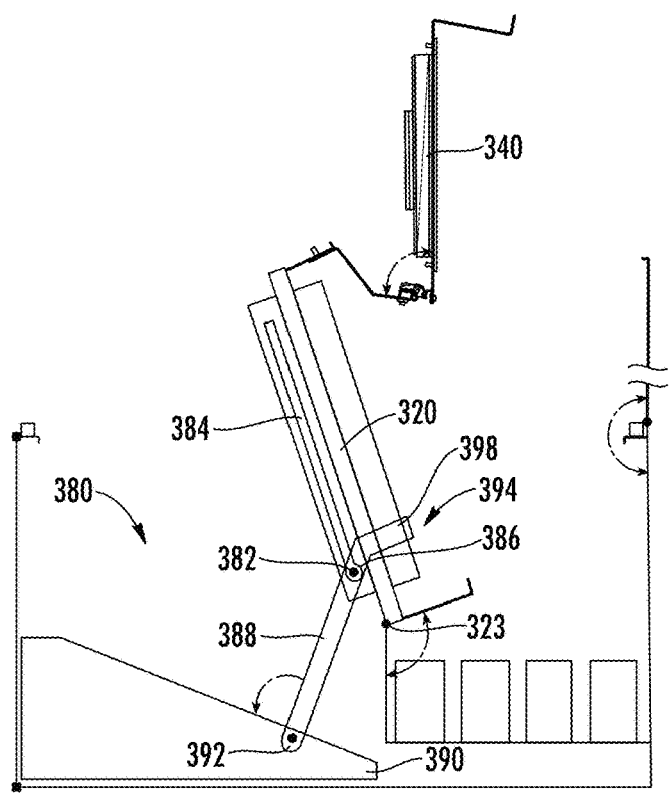
FIG. 14 is a top view of a fiber distribution hub having a distribution panel with a stay assembly in a fully accessible configuration, according to one or more embodiments shown and described herein.

Referring now to FIGS. 10-14, each of these embodiments illustrate top views of a parking door assembly 310 in various configuration from closed to open. FIGS. 10-12 illustrate top views of a parking door assembly 310 where the parking door 340 is positioned in configurations including a partially accessible configuration to a fully accessible configuration. As used herein, the parking door 340 is in the "partially accessible configuration" when at least the front 77 of the parking door 72 is accessible, absent the cabinet door 360. As used herein, the distribution panel 320 is in a "fully accessible configuration" when both the front 77 and back 79 of the parking door 72 are accessible. FIGS. 13 and 14 illustrate additional example configurations of the parking door assembly 310 including movement of both the parking door 340 and distribution panel 320 along with an example stay assembly 380 connected to the distribution panel 320 and cabinet support structure 390.

Referring to FIGS. 10-12, top views of a fiber distribution hub 300 including a parking door assembly 310 in various configurations from the partially accessible configuration to the fully accessible configuration are depicted. As shown herein by viewing FIGS. 10-12 in sequence, a swinging side 344 of the parking door 340 moves away from the pivot axis 323 of the distribution panel 320 when moving from a folded configuration or partially accessible configuration to an unfolded configuration or fully accessible configuration. Similarly, when viewing FIGS. 10-12 in reverse sequence, the swinging side 344 of the parking door 340 moves towards the pivot axis 323 of the distribution panel 320 when pivoting from the unfolded configuration or fully accessible configuration to the folded or partially accessible configuration. When the parking door 340 is in the unfolded configuration access to the fiber distribution field of the distribution panel 320 and the plurality of fiber optic connectors retained by the connector holder retaining structure of the parking door 340 is provided. In other words, the parking door pivots between a closed configuration (e.g. as shown in FIG. 10) to an open configuration (e.g. as shown in FIGS. 11 and 12). As shown herein by viewing FIGS. 10-12 in sequence, a swinging side 344 of the parking door 340 moves away from the pivot axis 323 of the distribution panel 320 when moving from a closed configuration or partially accessible configuration to an open configuration or fully accessible configuration. Similarly, when viewing FIGS. 10-12 in reverse sequence, the swinging side 344 of the parking door 340 moves towards the pivot axis 323 of the distribution panel 320 when pivoting from the closed configuration or fully accessible configuration to the closed or partially accessible configuration.

In some embodiments, the parking door assembly 310 includes a distribution panel 320 pivotally coupled along a pivot side 322 to an inner section 315. The distribution panel 320 is pivotally coupled to the inner section 315, for example, by a hinge, a sliding hinge, or any other joint capable of facilitating a pivoting action about a pivot axis 323. A door mounting bracket 330 connects a hinge structure 332 to a non-pivoting side 324 of the distribution panel 320, opposite the pivot side 322 of the distribution panel 320. The hinge structure 332 is further pivotally coupled to a parking door 340 along a pivot side 342 of the parking door 340. Opposite the pivot side 342 of the parking door 340 is a swinging side 344 of the parking door 340. The swinging side includes a stop flange structure 350 as described above. The stop flange structure 350 can provide a stop that inhibits over rotation of the parking door 340 into the closed configuration, which can reduce connector-to-connector contact and bending of the optical fibers located between the parking door 340 and the distribution panel 320.

Additionally the depicted embodiment of the fiber distribution hub 300 includes a cabinet door 360 pivotally coupled to a front edge 362 on a first side 364 of the fiber distribution hub 360 by one or more hinges 366. However, in other embodiments the cabinet door 360 may be movably connected to the exterior cabinet housing by means other than a hinge 366. The front edge 362 may extend around the perimeter of the access opening as described herein. A second side 368 opposite the first side 364 also includes a front edge 370. The front edge 370 may contact and engage the cabinet door 360 when the cabinet door is in a closed configuration as shown in FIG. 10. The front edges 362 and 370 may include a seal 372 extending along the front edges 362 and 370 such that the seal 372 is positioned between the front edges 362 and 370 and the cabinet door 360 when the cabinet door is in the closed configuration. The seal 372 may assure a tight or complete closure between the cabinet door 360 and the front edges 362 and 370 preventing unwanted materials from entering the interior of the fiber distribution hub 300.

Referring to FIG. 10, a top view of the fiber distribution hub 300 where the cabinet door 360 and parking door 340 are in a closed configuration is depicted. When the parking door 340 is in a closed position the stop flange structure 350 of the parking door 340 may contact an opposing stop flange structure 352 extending from the pivot side 322 of the distribution panel 320. Additionally, the cabinet door 360 contacts and engages the front edges 362 and 370 and optionally the seal 370. In the closed configuration, the parking door 340 and distribution panel 320 generally oppose each other and the parking door 340 prevents direct access to the distribution panel 320, absent the cabinet door 360. The space 355 between the parking door 340 and the distribution door 320 may be sufficient to accommodate the fiber optic cables stored on the parking door 340 and connected to the distribution panel 320. The space 355 is maintained by the offset provided by the door mounting bracket 330 and the stop flange structures 350 and 352.

Referring to FIG. 11, a top view of a fiber distribution hub 300 where the cabinet door 360 and parking door 340 are ajar, i.e., between a fully open and fully closed configuration is depicted. The cabinet door 360 moves between the opened and closed configuration by pivoting about a hinge 366. As illustrated, the cabinet door 360 has rotated from the closed position in FIG. 10 to a slightly open configuration in FIG. 11. Similarly, the parking door 340 pivots with respect to the distribution panel 320 by way of the hinge structure 332. As the parking door 340 moves from a closed configuration as shown in FIG. 10 to a slightly open configuration in FIG. 11, and the space 355 between the distribution panel 320 and parking door 340 increases. As the parking door 340 pivots away from the distribution panel 320, access to the fiber optic cables connected to the distribution panel 320 and the fiber optic cables stored on the parking door 340 increases. In other words, the back 379 of the parking door 340 moves away from the front 357 of the distribution panel 320.

Referring to FIG. 12, a top view of a fiber distribution hub 300 where the cabinet door 360 and parking door 340 are in an open configuration or fully accessible configuration is depicted. As depicted, the cabinet door 360 pivoted from a closed configuration in FIG. 10 to an open configuration in FIG. 12. In FIG. 12, the cabinet door 360 is generally aligned with the side 364 of the fiber distribution hub 300. In some embodiments, the cabinet door 360 may be opened more than 90 degrees from the closed configuration. With the cabinet door 360 open, the parking door 340 may pivot from a closed configuration or partially accessible configuration in FIG. 10 to an open configuration or fully accessible configuration in FIG. 12. The parking door 340 may pivot by way of the hinge structure 332 such that the fiber optic cables stored on the parking door 340 and the fiber distribution field 326 (also e.g., 56, FIG. 1) of the distribution panel 320 (also e.g., 52, FIG. 1) are simultaneously accessible. That is, for example, a service technician may simultaneously access both the fiber optic cables stored on the parking door 340 and the distribution panel 320 in a generally open workspace. In some situations, a service technician may require access to back 359 of the distribution panel 320 (i.e. the side opposite the fiber distribution field). In such instances, the distribution panel 320 may move from a partially accessible configuration to a fully accessible configuration or a configuration there between as depicted and described with reference to FIGS. 13 and 14.

Referring now to FIGS. 13 and 14, top views of a fiber distribution hub 300 having a distribution panel 320 that include a stay assembly 380 where the distribution panel 320 is rotated from a partially accessible configuration to a fully accessible configuration are depicted. The stay assembly 380 was excluded from FIGS. 10-12 for simplicity of illustration purposes which will now be described herein with relation to the movement of the distribution panel 320 in FIGS. 13 and 14. In some embodiments, the distribution panel 320 may include a stay assembly 380 for holding the distribution panel 320 in an open configuration. Upon pivoting the distribution panel 320 from a partially accessible configuration as depicted in FIG. 13 to a fully accessible configuration as depicted in FIG. 14 (i.e. pivoting the distribution panel) a holding bolt 382 slides within the slot 384 toward the stop portion 386. When the holding bolt 382 slides within the stop portion 386, gravity or another force, for example a spring force, acts to engage the holding bolt 382 into the stop portion. The engagement between the holding bolt 382 and the stop portion 386 holds the distribution panel 320 in position such that the distribution panel 320 cannot be further pivoted until the holding bolt 382 is disengaged from the stop portion 386. To disengage, a stay member 388 may be manually lifted, thus raising a section of the holding bolt 382 out of the stop portion 386. The distribution panel 320 may then be pivoted while the stay member 388 is manually lifted to prevent reengagement. In some embodiments, the slot 384 may be configured with multiple stop portions 386 corresponding to desired predetermined open positions.

Figure 15:
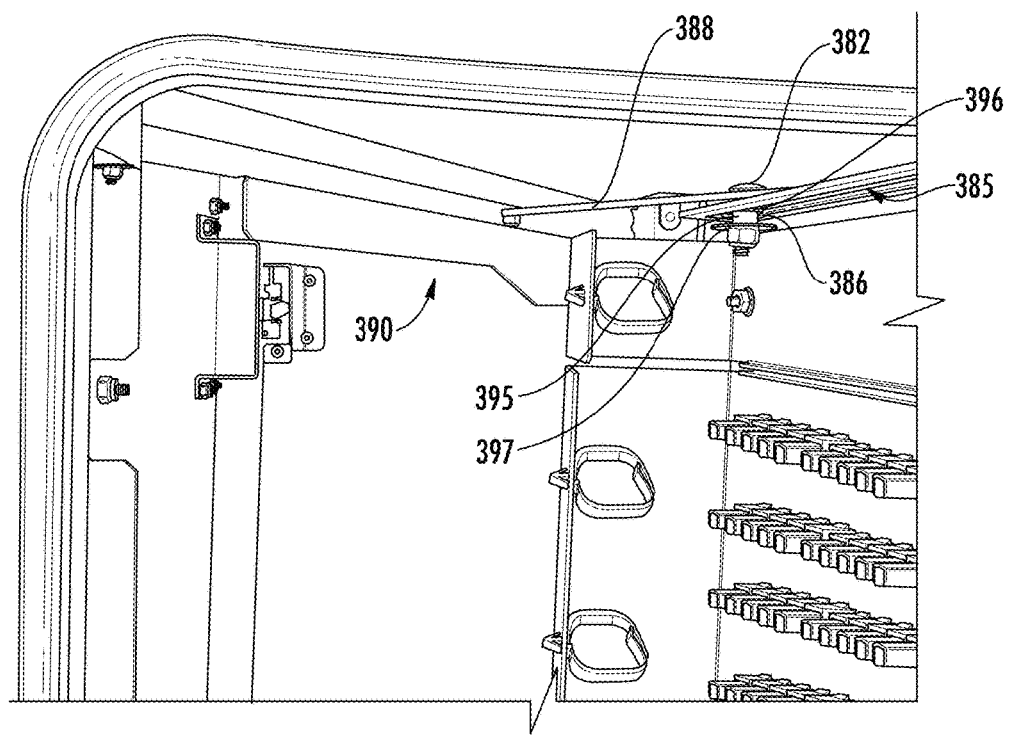
FIG. 15 is a partial perspective view of the interior of a fiber distribution hub comprising a stay assembly coupled to a distribution panel, according to one or more embodiments shown and described herein.

The stay assembly 380 will now be described in more detail with reference to FIGS. 13, 14 and 15. According to some embodiments, a stay assembly 380 may be implemented to hold the distribution panel 320 in a fully accessible configuration or a partially accessible configuration. As depicted the stay assembly 380 generally includes a stay member 388, a holding bolt 382, a slot 384 including a stop portion 386 configured with the distribution panel 320 and a support structure 390 coupled to the fiber distribution hub 300. A first end 392 of the stay member 388 is pivotally coupled to a support structure 390 of the fiber distribution hub 300. A slot 384 is configured along a top portion of the distribution panel 320. The slot 384 comprises a guide slot portion 385 and a stop portion 386. The stop portion 386 is configured to be larger than the adjacent guide slot portion 385 of the slot 384. A second end 394 of the stay member 388 is slidably coupled to the slot 384 by a holding bolt 382.

The holding bolt 382 comprises a first diameter section 395 along the length of the holding bolt 382, a second diameter section 396 along the length of the holding bolt 382 and a retaining flange 397. The diameter of the first diameter section 395 is smaller than the diameter of the second diameter section 396. The first diameter section 395 engages the guide slot portion 385 of the slot 384 to facilitate a sliding interaction between the stay member 388 and the slot 384. To accomplish a sliding interaction between the stay member 388 and the slot 384, the diameter of the first diameter section 395 is smaller than the width of the guide slot portion 385 and the diameter of the second diameter section 396 is larger than the width of the guide slot portion 385. The second diameter section 396 engages the stop portion 386 of the slot 384 thereby preventing the holding bolt 382 from sliding into adjacent guide slot portions 385 of the slot 384. The second diameter section 396 is positioned between the stay member 388 and the first diameter section 395 along the length of the holding bolt 382 so that when the holding bolt 382 aligns with the stop portion 386 gravitational force on the holding bolt 382 causes the second diameter section 396 to engage with the stop portion 386 of the slot 384. The retaining flange 397 is positioned adjacent the first diameter section 395 such that the slot 384 is between the retaining flange 397 and the stay member 388. The retaining flange 397 keeps the holding bolt 382 within the slot 384 during sliding operation and engagement and disengagement of the holding bolt 382 and stop portion 386.

The second end 394 of the stay member 388 may optionally comprise a tab portion 398. The tab portion 398 may extend at an angle with respect to the length of the stay member 388 and optionally beyond the top portion of the distribution panel 320. The tab portion 398 allows the stay member 388 to be lifted and thereby disengaged from the stop portion 386 of the slot 384. The tab portion 398 may extend beyond the front 357 of the distribution panel 320. The extension of the tab portion 398 may offer easier disengagement of the second diameter section 396 of the holding bolt 382 from the stop portion 386 configured with the slot 384.

It should be understood from the embodiments describe and shown with respect to at least FIGS. 10-15 that the distribution panel and the parking door assembly are configured such that the distribution panel is able to pivot between the partially accessible configuration and the fully accessible configuration while the parking door pivots between the folded configuration and the unfolded configuration.

As used herein, the terms "optical fiber cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets and the like. Likewise, other types of suitable optical fibers include bend insensitive optical fibers, or any other expedient of a medium for transmitting light signals.

It will be apparent to those skilled in the art that various modifications and variations can be made to the embodiments described herein without departing from the spirit and scope of the claimed subject matter. Thus, it is intended that the specification cover the modifications and variations of the various embodiments described herein, provided such modification and variations come within the scope of the appended claims and their equivalents.

What is claimed is:

1. A fiber distribution hub comprising:
   an exterior cabinet housing comprising a front with an access opening and defining a cable holding volume therein;
   a cabinet door moveably connected to the exterior cabinet housing, the cabinet door comprising an open configuration allowing access to the cable holding volume through the access opening and a closed configuration that inhibits access to the cable holding volume through the access opening;
a distribution panel located in the cable holding volume, the distribution panel comprising a fiber distribution field formed of connector adapters that provide a connection between feeder cables and distribution cables, the distribution panel comprising a pivot axis opposite a swinging side, wherein the swinging side moves about the pivot axis between a partially accessible configuration and a fully accessible configuration; the pivot axis located away from the access opening; and
a parking door assembly moveably connected to the swinging side of the distribution panel, the parking door assembly comprising:
a parking door comprising a connector holder retaining structure configured to retain a plurality of fiber optic connectors; and
a hinge structure that connects the parking door to the swinging side of the distribution panel.

2. The fiber distribution hub of claim 1, wherein:
a swinging side of the parking door moves away from the pivot axis of the distribution panel when pivoting from a folded configuration to an unfolded configuration; and
the swinging side of the parking door moves towards the pivot axis of the distribution panel when pivoting from the unfolded configuration to the folded configuration.

3. The fiber distribution hub of claim 2, wherein the parking door in the unfolded configuration provides access to the fiber distribution field of the distribution panel and the plurality of fiber optic connectors retained by the connector holder retaining structure of the parking door.

4. The fiber distribution hub of claim 2, wherein the distribution panel and the parking door assembly are configured such that the distribution panel is able to pivot between the partially accessible configuration and the fully accessible configuration while the parking door pivots between the folded configuration and the unfolded configuration.

5. The fiber distribution hub of claim 1, wherein:
the parking door pivots between the closed configuration and the open configuration, whereby a swinging side of the parking door moves away from the pivot axis of the distribution panel when pivoting from the closed configuration to the open configuration; and
the swinging side of the parking door moves towards the pivot axis of the distribution panel when pivoting from the open configuration to the closed configuration.

6. The fiber distribution hub of claim 1, further comprising a door mounting bracket that connects the hinge structure to the swinging side of the distribution panel.

7. The fiber distribution hub of claim 6, wherein the door mounting bracket has a size and shape that spaces a pivoting side of the parking door away from the swinging side of the distribution panel.

8. The fiber distribution hub of claim 7, wherein the distribution panel comprises a lock structure that locks the distribution panel in the partially accessible configuration, wherein the lock structure is accessible through a space between the pivoting side of the parking door and the swinging side of the distribution panel.

9. The fiber distribution hub of claim 1, wherein the parking door comprises a door body comprising the pivoting side, a swinging side opposite the pivoting side, a top and a bottom, a stop flange structure that extends outwardly from the door body at the swinging side and along only a portion of a height of the swinging side.

10. The fiber distribution hub of claim 9, wherein the swinging side of the door body extends vertically to a tapered portion that extends downwardly to the bottom of the door body.

11. The fiber distribution hub of claim 9, wherein the door body includes a handle structure located at the top of the door body.

12. The fiber distribution hub of claim 1, wherein the parking door comprises one or more connector holder retaining structure that are aligned one over another along a height of the parking door, each of the one or more connector holder retaining structure is configured to retain a plurality of optical fiber connectors.

13. The fiber distribution hub of claim 12, wherein a first vertical distance between an uppermost connector holder retaining structure and a top of the parking door is less than a second vertical distance between a bottommost connector holder retaining structure and a bottom of the parking door.

14. The fiber distribution hub of claim 1, further comprising a stay assembly wherein:
the stay assembly comprises a stay member;
the stay member comprises a first end and a second end;
the first end of the stay member is pivotally coupled to the fiber distribution hub;
the second end of the stay member is slidably coupled to a slot extending along a top portion of the distribution panel such that the second end of the stay member slidably engages the slot as the distribution panel moves between the partially accessible configuration and the fully accessible configuration; and
the second end of the stay member engages a stop in the slot when the distribution panel is in the fully accessible configuration.

15. The fiber distribution hub of claim 14, wherein the stay assembly comprises a tab portion extending from the second end of the stay member to facilitate disengagement between the stay member and the stop.

16. The fiber distribution hub of claim 14, wherein the connector holder retaining structure comprises an upper panel and a lower panel that meet at an apex forming a V-shape, wherein the upper panel includes openings that are arranged to receive holder retainers of an optical fiber connector holder such that optical fiber connectors of the optical fiber connector holder have a downward angled orientation extending away from the apex.

17. A method of assembling a parking door assembly to a fiber distribution hub thereby increasing a parking capacity of the fiber distribution hub, the method comprising:
obtaining the parking door assembly, the parking door assembly comprising:
a parking door comprising a connector holder retaining structure configured to retain a plurality of fiber optic connectors;
a hinge structure that connects to a pivot side of the parking door opposite a swinging side of the parking door; and
a door mounting bracket that connects to the hinge structure; and
connecting the parking door assembly comprising the parking door, the hinge structure and the door mounting bracket to a swinging side of a distribution panel opposite a pivot axis of the distribution panel of the fiber distribution hub, the pivot axis located away from an access opening of the distribution hub, wherein:

the distribution panel comprises a fiber distribution field formed of connector adapters that provide a connection between feeder cables and distribution cables, the distribution panel is capable of moving between a partially accessible configuration and a fully accessible configuration, and the parking door is capable of moving between a partially accessible configuration and a fully accessible configuration.

18. The method of claim 17, further comprising removing a swing bracket from the swinging side of the distribution panel thereby exposing openings used in connecting the door mounting bracket to the swinging side of the distribution panel.

19. The method of claim 17, wherein the step of connecting the parking door assembly comprises connecting the door mounting bracket to the swinging side of the distribution panel.

20. The method of claim 19, wherein the step of connecting the parking door comprises connecting the hinge structure to the door mounting bracket.

* * * * *